(12) United States Patent
Hong

(10) Patent No.: US 7,212,366 B2
(45) Date of Patent: May 1, 2007

(54) REVIEW CONTROL METHOD OF VIDEO CASSETTE RECORDER

(75) Inventor: Sung Pyo Hong, Soowun-si (KR)

(73) Assignee: LG Electronics, Inc., Seoul (KR)

( * ) Notice: Subject to any disclaimer, the term of this patent is extended or adjusted under 35 U.S.C. 154(b) by 1313 days.

(21) Appl. No.: 10/029,235

(22) Filed: Dec. 28, 2001

(65) Prior Publication Data

US 2002/0090199 A1      Jul. 11, 2002

(30) Foreign Application Priority Data

Dec. 28, 2000   (KR) ............................. 2000-84682

(51) Int. Cl.
*G11B 5/02*        (2006.01)

(52) U.S. Cl. ....................................... 360/55

(58) Field of Classification Search .................. 360/55, 360/94, 85, 96.5; 242/355.1, 356.4
See application file for complete search history.

(56) References Cited

U.S. PATENT DOCUMENTS

| | | | | |
|---|---|---|---|---|
| 4,779,153 A | * | 10/1988 | Tsubota | 360/96.5 |
| 4,788,609 A | * | 11/1988 | Yamada et al. | 360/85 |
| 4,949,203 A | * | 8/1990 | Kunimaru et al. | 360/85 |
| 5,114,093 A | * | 5/1992 | Kunimaru et al. | 242/355.1 |
| 5,472,151 A | * | 12/1995 | Choi et al. | 242/356.4 |
| 5,486,958 A | * | 1/1996 | Choi et al. | 360/85 |
| 5,535,957 A | * | 7/1996 | Shin | 242/355.1 |
| 5,566,035 A | * | 10/1996 | Kim | 360/85 |
| 5,754,360 A | * | 5/1998 | Lee et al. | 360/85 |
| 5,825,583 A | * | 10/1998 | Kang et al. | 360/85 |
| 6,111,721 A | * | 8/2000 | Kim et al. | 360/94 |

\* cited by examiner

*Primary Examiner*—Fred F. Tzeng
(74) *Attorney, Agent, or Firm*—Birch, Stewart, Kolasch & Birch, LLP

(57) ABSTRACT

The present invention relates to a review control method of a video cassette recorder capable of controlling a review operation without noises on a screen in switching from a play mode into a review mode.

1 Claim, 6 Drawing Sheets

REVIEW CONTROL METHOD OF VIDEO CASSETTE RECORDER

BACKGROUND OF THE INVENTION

1. Field of the Invention

The present invention relates to a review control method of a video cassette recorder, in particular, for implementing a review operation without noises on a screen in switching from a play mode into a review mode.

2. Description of the Related Art

A video cassette recorder uses a capstan 7 and a pinch roller 9 to run a tape at a regulated rate. The capstan 7 performs loading/unloading under the force of the capstan motor 8, and provides a force for running the tape. The pinch roller 9 is closely contacted with the capstan 7, and functions to pull the tape in a specific running direction. In addition to the foregoing components, a tension belt 4 can be included as a component that is used for running the tape. The tension belt 4 is used to uniformly maintain a tension applied to the tape in a running mode such as a play mode for regenerating the tape while running the same.

In a conventional video cassette recorder having the foregoing configuration, a configuration of mechanical modes is as shown in FIG. 1.

In a play mode PLAY, the pinch roller 9 maintains a compressed state, and a tension band brake 5 has an operation state On. A supply reel brake 13 and a turning-up reel brake 15 are released having off states Off to help forward running of the tape. FIG. 2 illustrates the components in such a play mode PLAY.

In a review mode REV, the tension band brake 5 switches into a released off state Off from the play mode PLAY, and the turning-up reel brake 15 is turned on into an operating or on state to help review. FIG. 3 illustrates the components in such a review mode REV.

As shown above, the pinch roller 9 has the compressed state in all ranges of the play mode PLAY and the review mode REV. A video cassette tape with such a configuration tends to have noises due to droop of the tape when switching from the play mode PLAY to the review mode REV.

Therefore, the conventional video cassette recorder performs operation processes as shown in FIG. 4 in order to solve the problems as set forth above.

When a key is inputted for switching to the review mode REV during operation in the play mode PLAY, a control unit (not shown) reverses a loading motor (not shown) while rotating forward the capstan motor 8 continuously at a basic rate so as to be positioned in a loading end mode L/D END where the pinch roller 9 has a decompressed off state Off. When positioned in the loading end mode L/D END in this operation, the capstan motor 8 and the loading motor are stopped. This operation state is shown in a range A in FIG. 4.

Then, the capstan motor 8 is reversed at a predetermined amount. This operation moves an idle roller 10 toward a supply reel 3. Then, the capstan motor 8 is stopped.

After the capstan motor 8 is stopped and the loading motor is forward rotated into the review mode REV, the capstan motor 8 is reversed to carry out the review operation. This operation state is shown in a range B in FIG. 4.

In the foregoing operation, the supply reel brake 13 switches from an off state into an on state and then returns to the off state in order to prevent the tape from being unwound from the supply reel 3. Switching the turning-up reel brake 15 from the off state into the on state is necessary to stabilize a running path of the tape by applying back tension to the tape in the review operation.

In other words, the taped is drooped while the tension band brake 5 is switched from an on operation into an off operation in switching of the conventional video cassette from the play mode PLAY into the review node REV. The drooping of the tape is controlled by continuously forward rotating the capstan motor 8 on the loading end mode L/D END where the pinch roller 9 has the off state Off.

However, the review control method of the conventional video cassette recorder operating in such a manner brings about the following problems.

The turning-up reel brake 15 is necessarily switched into the on state in the range of the play mode PLAY and the review mode REV in order to progress the review mode. The brake torque of the turning-up reel brake 15 acts as the load on the turning-up reel 1 as soon as the turning-up reel brake 15 is on. Therefore, the rotation torque of the tinning-up reel 3 decreases as much as the brake torque acting as above. If the forward torque of a friction clutch 12 is not sufficiently larger than the load torque of the turning-up reel brake 15 due to such actions, the tape is unwound (the turning-up reel is incapable of rotating) after the pinch roller 9 in the range A in FIG. 4 and noises due to the tape drooping take place from a time point, when the pinch roller 9 is off, in the range B.

If the forward torque of the clutch 12 is set high to solve the foregoing problem, the capstan motor 8 is barely stopped at a correct position Moreover, a clutch friction member is abraded to lower the reliability of a product.

SUMMARY OF THE INVENTION

Accordingly, the present invention has been devised to solve the foregoing problems and it an object of the invention to provide a review control method of a video cassette recorder capable of setting and controlling the forward torque or a friction clutch regardless of the load torque of a turning-up reel brake.

It is another object of the invention to provide a review control method of a video cassette recorder capable of constantly providing a clean screen in switching into a review mode.

It is further another object of the invention to provide a review control method of a video cassette recorder capable of reducing the forward torque of a friction clutch to ensure easy control in a still mode and a slow mode.

In accordance with an aspect of the invention to obtain the foregoing objects, a review control method of a video cassette recorder comprises the following steps of: controlling forward/reverse rotation of a capstan motor and a loading motor, in a range switching between a play mode and a review mode, to be positioned in the review mode; controlling a tension band brake from an on state into an off state, in the switching between the play mode and the review mode; controlling a supply reel brake between on and off states in a certain range, in the switching between the play mode and the review mode; and controlling a turning-up reel brake from an off state into an on state, in which the turning-up reel brake has the off state in a certain range.

DETAILED DESCRIPTION OF THE PREFERRED EMBODIMENT

Figure 5:
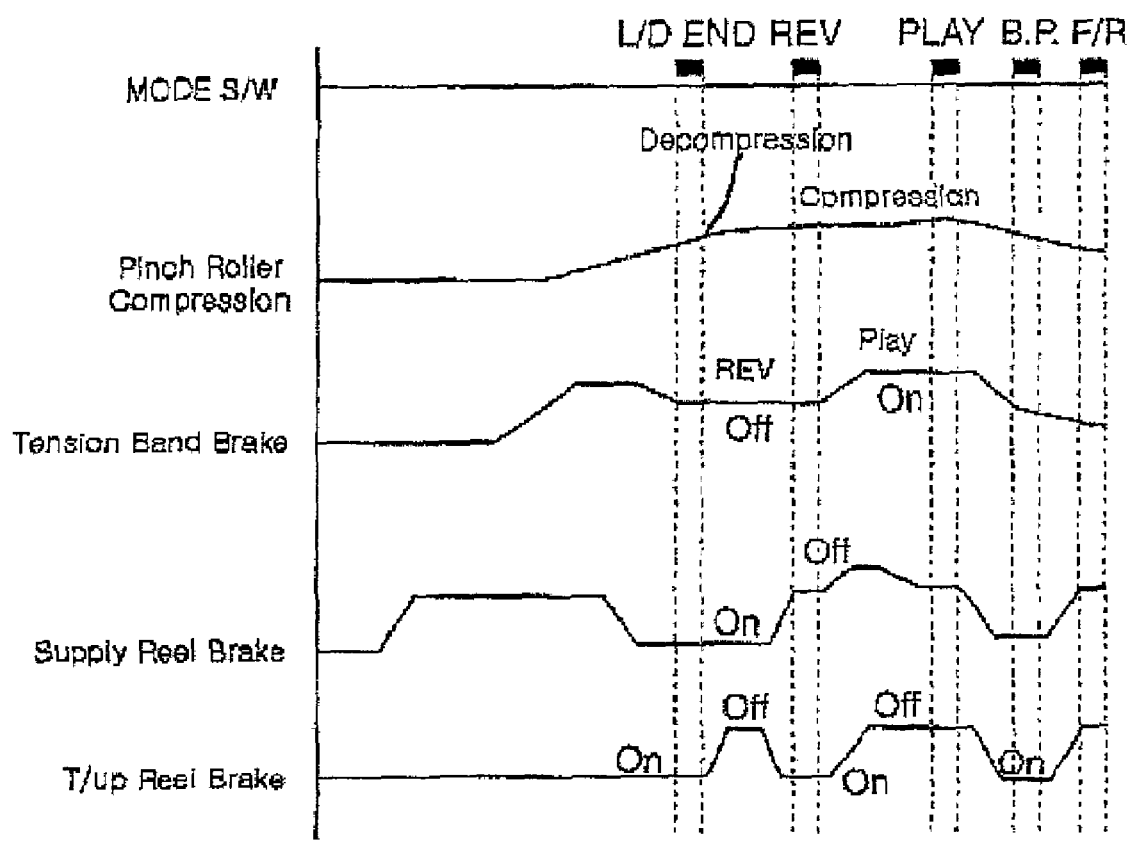
FIG. 5 shows a configuration of mechanical modes in a video cassette recorder in accordance with the invention.

FIG. 5 shows a configuration of mechanical modes in a video cassette recorder in accordance with the invention.

Figure 1:
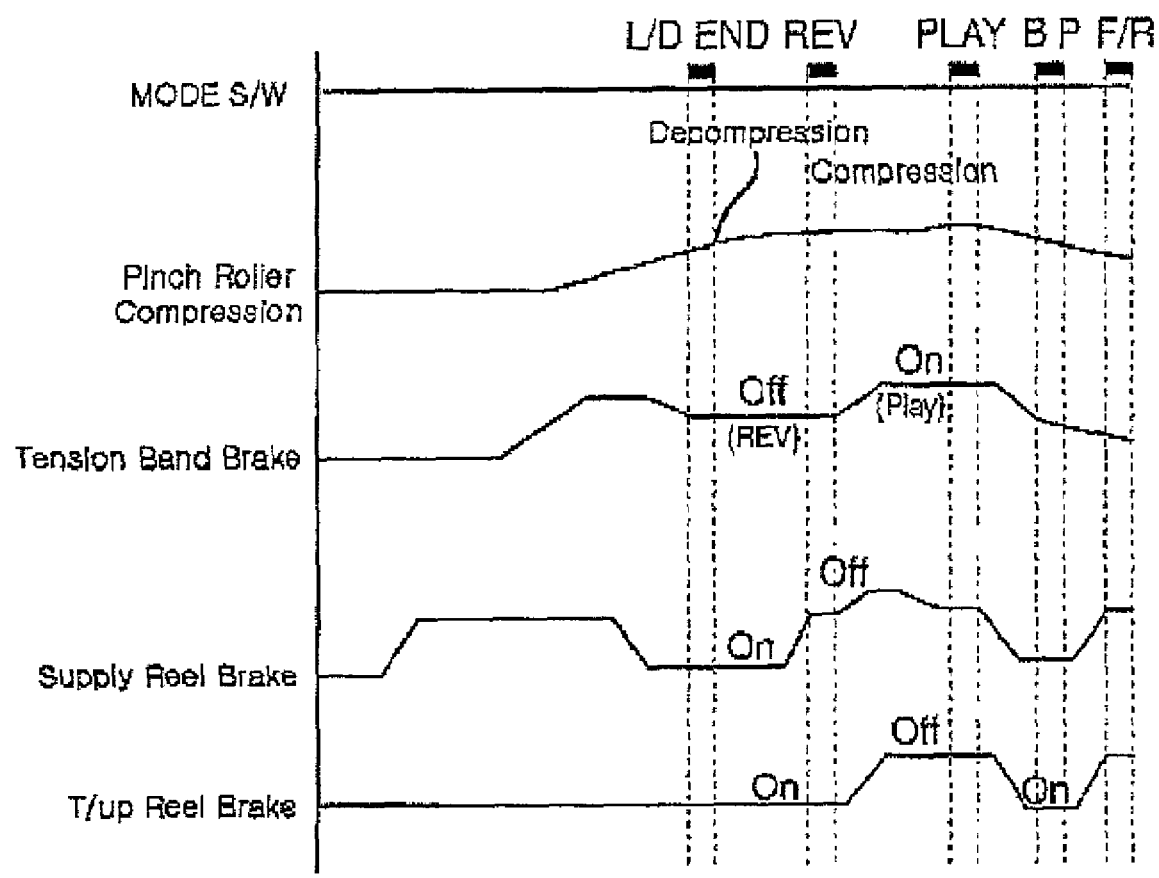
FIG. 1 shows a configuration of mechanical modes in a video cassette recorder of the related art.
Figure 2:
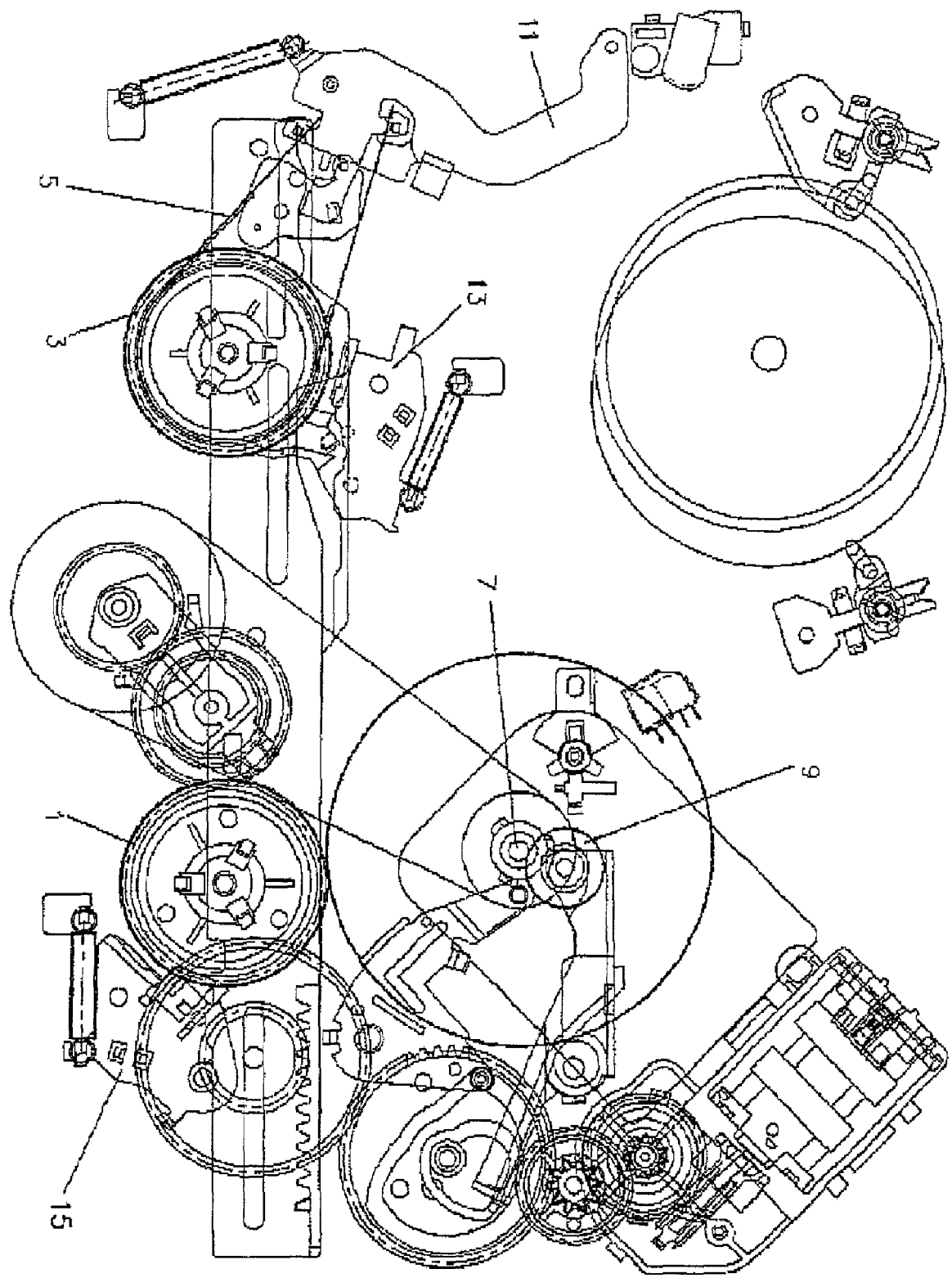
FIG. 2 shows operation states in a play mode of a video cassette recorder.

In the play mode PLAY shown in FIG. 2, a pinch roller 9 maintains a compressed state, and a tension brake 5 has an operation state On. A supply reel brake 13 and a turning-up reel brake 15 are released having off states Off to help the tape running in a forward direction.

Figure 3:
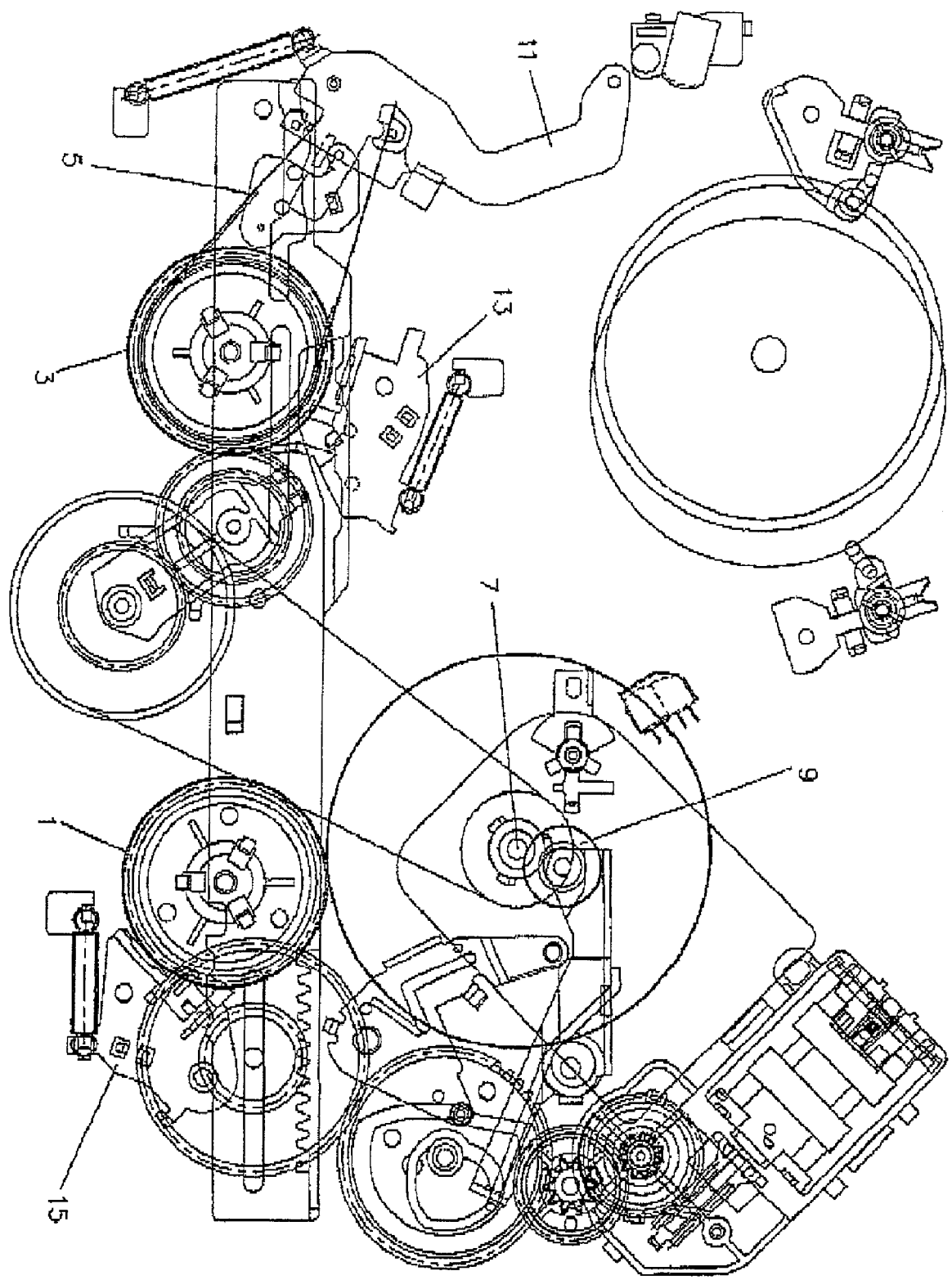
FIG. 3 shows operation states in a review mode of a video cassette recorder.
Figure 4:
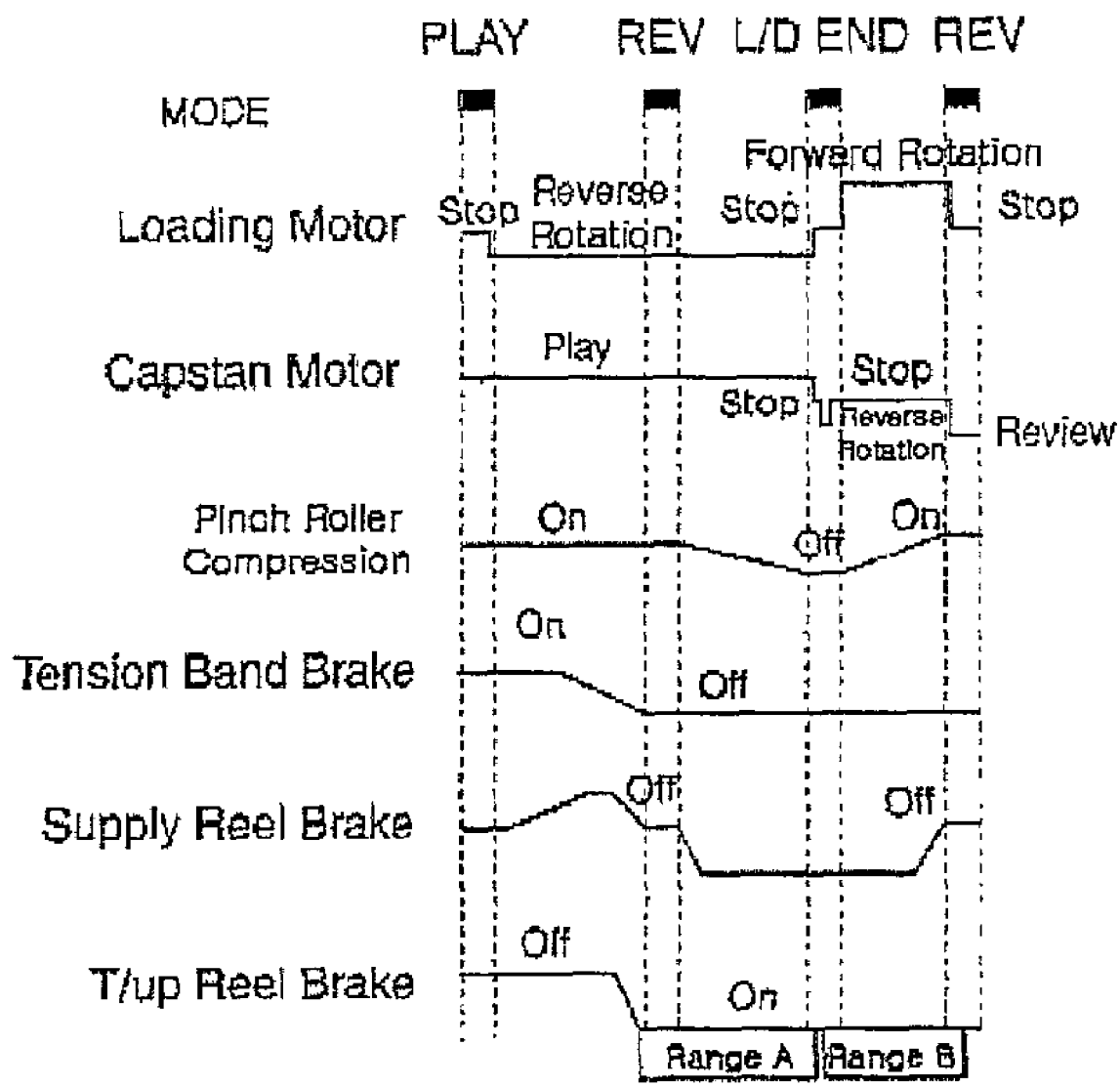
FIG. 4 shows an operation process in switching from a play mode into a review mode in a video cassette recorder of the related art.

In the review mode REV shown in FIG. 3, the pinch roller 9 maintains a compressed state, whereas the tension band brake 5 is released into an off state Off. The supply reel brake 13 has an off state Off, whereas the turning-up reel brake 15 has in operation or on state On to help reviewing.

However, differently from the related art, the invention adds an off state between a loading end mode L/D END and the review mode REV in order to regulate the supply reel brake 15, which will be explained in detail in reference to operation processes.

Figure 6:
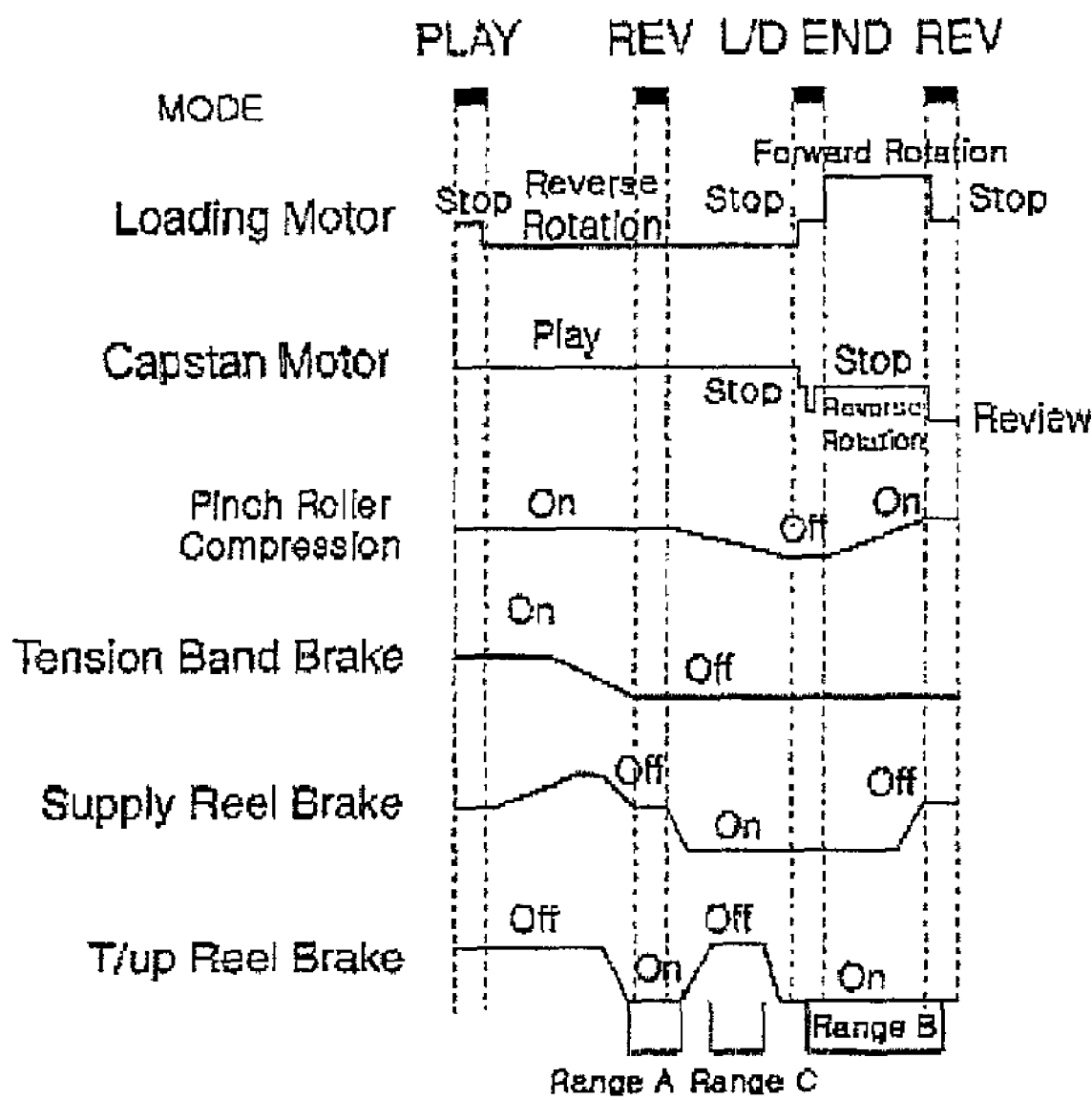
FIG. 6 shows an operation process in switching from a play mode into a review mode in a video cassette recorder in accordance with the invention.

As in the foregoing configuration, the pinch roller 9 is compressed in all of the ranges of the play mode PLAY and the review mode REV. When switched from the play mode PLAY to the review mode REV, a video cassette recorder having such operation modes carries out operation processes as shown in FIG. 6.

When a key for switching into the review mode REV is inputted during operation in the play mode PLAY, a control unit (not shown) rotates a loading motor (not shown) into a reverse direction while continuously rotating forward or playing the capstan motor 8 at a basic rate so as to be positioned in the loading end mode L/D END where the pinch roller 9 is decompressed. When positioned in the loading end mode L/D END in this operation, the capstan motor 8 and the loading motor are stopped.

The operation as set forth above controls drooping of the tape generated while the tension band brake 5 is switched from an on state into an off state. In other words, the tension band brake 5 has the on state in the play mode PLAY, and the off state in the review mode REV. Therefore, drooping of the tape generated while switching the operation of the tension band brake 5 is controlled due to forward rotation of the tension band brake 5.

Then, the capstan motor 8 is reversed at a predetermined amount. This moves an idler 10 toward a supply reel 1. The capstan motor 8 is stopped. After the loading motor is rotated forward to be positioned in the review mode REV while the capstan motor 8 is stopped, the capstan motor 8 is reversed to carry out the review operation. The operation states of the loading motor and the capstan motor 8 in switching from the playing mode PLAY into the review mode REV are shown in FIG. 6.

During the operation as set forth above, the supply reel brake 13 returns to the off state, after switching from the off state to an on state. The supply reel brake 13 operates in such a manner to prevent the tape from unwinding from the supply reel 1 during switching from the play mode PLAY into the review mode REV.

During the operation as set forth above, the turning-up reel brake 15 is controlled to have the off state in the play mode PLAY and the on state in the review mode REV. This operation is required to stabilize a running path of the tape by applying tack tension to the tape. Therefore, switching from the off state into the on state is required while switching from the play mode PLAY to the review mode REV to perform the review mode REV.

Therefore, the operation of the turning-up reel brake 15, as shown in FIG. 6, is changed from the off state to the on state for a predetermined period (a range A in FIG. 6). In such a range, occasionally clutch torque is weakened thereby failing to wind the tape.

Then, between the review mode REV and the loading end mode L/D END is provided a range C in which the turning-up reel brake 15 is switched into the off state again while passing through the same. The tape unwound in the range A is completely wound.

While passing through the loading end mode L/D END, the turning-up reel brake 15 is switched from the off state into the on state to have the operation state in the review mode REV.

In accordance with the invention, the tape which was loosened during switching from the play mode PLAY into the review mode REV can be completely wound around the range C in FIG. 6. Therefore, the tape drooping does not take place even in the switching range of the pinch roller 9 from the on state into the off state thereby constantly providing a screen without noises. The operation processes of the invention removes such limitations that the forward torque of the friction clutch 12 should be set sufficiently larger than the load torque of the turning-up reel brake 15.

As set forth above, it is the fundamental technical principle in accordance with the invention to remove the tape drooping generated during switching from the play mode PLAY into the review mode REV by regulating the operation of the turning-up reel brake 15.

Therefore, the invention has the following effects: First, the screen without noises can be constantly provided because the tape drooping does not take place in the switching range from the play mode into the review mode. Second, the capstan motor can be readily controlled in both of the control mode and the stationary mode because it is unnecessary to set the forward torque of the friction clutch at the high amount. Third, the torque of the friction clutch is reduced to minimize abrasion of a friction member thereby enhancing the reliability of a product. Fourth, the foregoing effects enhance the product reliability about a cheap deck mechanism which has no JOD device with the pinch roller compressed in the entire ranges of the play mode and the review mode.

What is claimed is:

1. A review control method of a video cassette recorder, the method comprising the following steps of:
    controlling forward/reverse rotation of a capstan motor and a loading motor, in a range switching between a play mode and a review mode, to be positioned in the review mode;
    controlling a tension band brake from an on state into an off state, in the switching between the play mode and the review mode;
    controlling a supply reel brake between on and off states in a certain range, in the switching between the play mode and the review mode; and
    controlling a turning-up reel brake from an off state into an on state, in which the turning-up reel brake has the off state in a certain range.

* * * * *